June 9, 1942.　　　　A. W. KIMBALL　　　　2,285,587
CONTROL SYSTEM
Filed July 26, 1940　　　3 Sheets-Sheet 1

WITNESSES:
N. F. Susser.
Albert L. Jeffrey.

INVENTOR
Albert W. Kimball.
BY
Paul E. Friedemann
ATTORNEY

June 9, 1942.   A. W. KIMBALL   2,285,587
CONTROL SYSTEM
Filed July 26, 1940   3 Sheets-Sheet 2
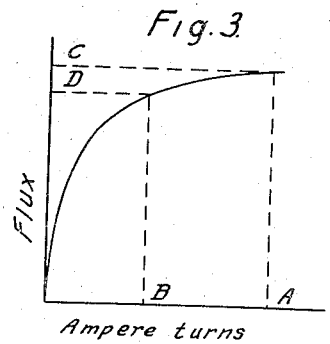
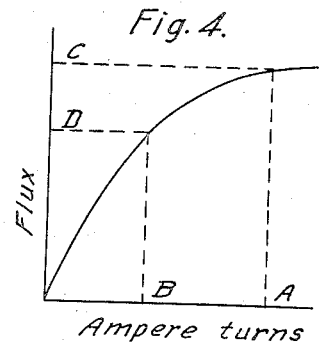
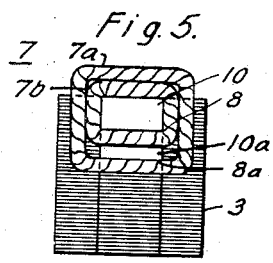
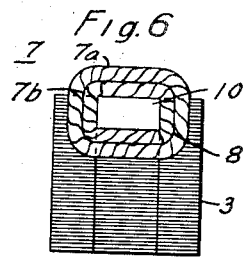
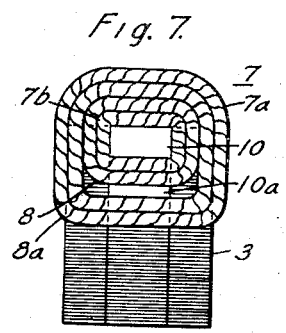
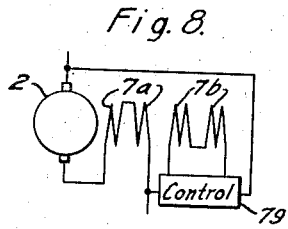
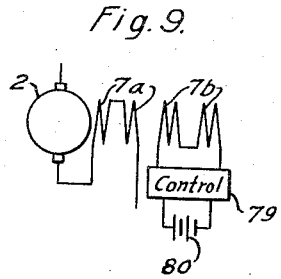
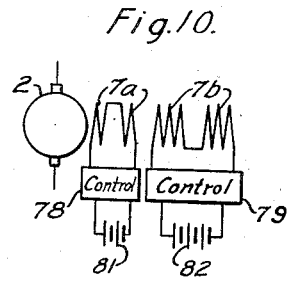
WITNESSES:
INVENTOR
Albert W. Kimball.
BY
Paul E. Friedemann
ATTORNEY June 9, 1942.  A. W. KIMBALL  2,285,587
CONTROL SYSTEM
Filed July 26, 1940  3 Sheets-Sheet 3

WITNESSES:
N. F. Susser
Albert L. Jeffrey

INVENTOR
Albert W. Kimball
BY
Paul E. Friedemann
ATTORNEY

Patented June 9, 1942

2,285,587

UNITED STATES PATENT OFFICE 2,285,587

CONTROL SYSTEM

Albert W. Kimball, Forest Hills, Pa., assignor to Westinghouse Electric & Manufacturing Company, East Pittsburgh, Pa., a corporation of Pennsylvania Application July 26, 1940, Serial No. 347,662

13 Claims. (Cl. 290—40)

My invention relates to dynamo-electric machines and more particularly to control systems for electric generators, or motors.

My invention is particularly applicable to portable power plants, for example, such as are utilized with anti-aircraft units.

Anti-aircraft units usually comprise several independent components such as a prime mover, (for example, a gas or oil engine), an electric generator, control equipment for the engine and generator, a detecting or listening unit and an electric arc or even an incandescent lamp searchlight unit.

In many instances this equipment must be transported from one location to another and must of necessity be of rugged construction as well as compact and as light in weight as is practical.

One of the primary requisites of an anti-aircraft unit is that the power supply be capable of delivering power of different quantities to the detecting device and to the searchlight or both. Since the detecting device requires only a small amount of power as compared to the searchlight, the generator, therefore, must be capable of supplying either a light load or a heavy load as operating conditions may require.

It has been found highly desirable that a generator operating under these conditions, i. e. supplying a light load, then a heavy load, and back to a light load and operating through several of such cycles, have such voltage output characteristics that the required voltage for each load is obtained at each return to that load.

Voltage regulation of the generator under such conditions could, of course, be obtained by the use of a voltage regulator. However, such regulators of commercial design are not sufficiently rugged for this type of service and their use is undesirable as they require additional maintenance to keep the power plant in proper operation.

My invention is directed primarily to overcome these undesirable features and to provide an electric generator and control therefor for anti-aircraft units which shall have good voltage regulation output characteristics at different speeds and under different load requirements, without necessitating the use of independent voltage regulation apparatus.

I have found that by placing auxiliary field windings on the pole pieces of the generator, in addition to the usual shunt and series connected field windings, and connecting the auxiliary field windings in circuit with the main field windings of the generator by control apparatus, and by providing a non-magnetic gap to cooperate with the auxiliary field windings, the desired voltage regulation may be obtained to a very fine degree at various speeds of the generator and under different load requirements.

An object of my invention, therefore, is to provide an electric generator capable of supplying a varying load, with the use of a minimum of control and regulating equipment.

Another object of my invention is to provide an electric generator which may be driven at different speeds and still maintain substantially constant voltage output characteristics.

Another object of my invention is to provide an electric generator having an auxiliary field winding and a cooperating non-magnetic gap for controlling the saturation of the magnetic circuit of the generator.

A further object of my invention is to provide an electric generator and control system therefor, for anti-aircraft equipment.

Other objects and advantages will become apparent from a study of the following specification when considered in conjunction with the accompanying drawings, in which:

Fig. 3 is a curve showing the saturation of a magnetic core, control path without a non-magnetic gap.

Fig. 4 is a curve showing the saturation of a magnetic core, control path with a non-magnetic gap.

Figs. 5, 6 and 7 are plan views of frame ends of pole pieces showing various modifications of the auxiliary field winding structure and the various ways the auxiliary winding or windings may be mounted on the pole pieces. More specifically:

Fig. 5 illustrates a plurality of auxiliary windings placed in a plurality of channels in the pole piece;

Fig. 6 illustrates a plurality of auxiliary windings placed in a single channel in the pole piece; and Fig. 7 illustrates a plurality of auxiliary windings placed in a plurality of channels in the pole piece.

Figs. 8, 9 and 10 are schematic circuit diagrams showing the various connections of the auxiliary windings shown in the structures in Figs. 5, 6 and 7.

Figure 1:
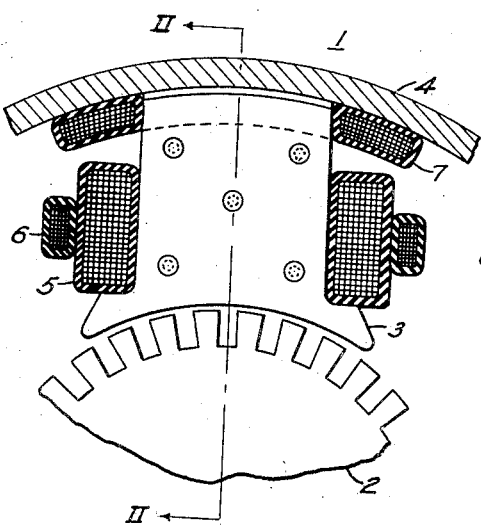
Figure 1 is a fragmentary view of a multi-pole electric generator showing the usual shunt and series field windings, also the auxiliary field winding, in section.
Figure 2:
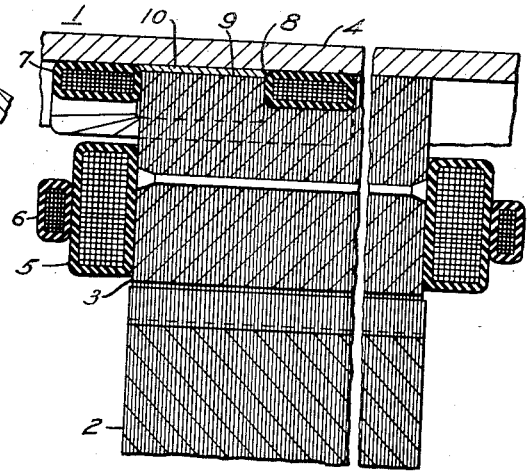
Fig. 2 is a fragmentary sectional view of the portion of the generator shown in Figure 1, taken along the line II—II, showing the auxiliary field winding and the non-magnetic gap.

Referring to Figures 1 and 2 of the drawings, numeral 1 designates a fragment of a multi-pole compound type direct current generator, having an armature 2 and a field pole piece 3, secured to a frame portion 4. The pole piece 3 is provided with the usual shunt field winding 5, and series field winding 6. The generator may also be provided with commutating poles and windings (not shown in Figs. 1 and 2 since their purpose is readily understood by those skilled in the art). It is to be understood, however, that the complete generator comprises a plurality of pole pieces and corresponding field windings.

An auxiliary field winding 7 is also provided on the pole piece 3. It is this auxiliary winding 7, the introduction of a non-magnetic gap between the frame of the generator and the poles, and the method of connecting the auxiliary winding 7 in control circuit relation with the shunt field coil 5, the distribution and control of magnetic flux in the magnetic circuit of the generator effected by the auxiliary winding 7 and the non-magnetic gap that contribute to the novelty of my invention.

The auxiliary field winding 7 is preferably disposed intermediate the pole piece 3 and the frame 4 in a slot in the back face of the pole 3, as shown in Figs. 1 and 2 of the drawings.

However, it may also be disposed in any other convenient and effective location consistent with good constructional design and as requirements may necessitate. For example, the auxiliary winding 7 may comprise a plurality of individual coils placed in the same slot, as shown in Figs. 6 and 7 and be connected either in shunt or series circuit relation or any combination thereof or they may be separately excited depending upon the type of saturation control desired. It is obvious that various constructions of the auxiliary winding 7, as well as various ways of placing it or them in the magnetic circuit and ways of connecting it or them, as above described, for example, may be devised. My invention is therefore not to be limited to the specific structures illustrated.

Referring now to Figs. 1 and 2, provision for locating the winding 7 in mechanical and magnetic relation with respect to the pole piece 3 and the frame 4, may be effected by providing a slot or channel 8 in the back face of the pole 3, i. e., the face of the pole nearest the frame 4. One side of the winding 7 is placed in the channel 8, the other side and the two ends of the winding 7 being disposed externally of the pole piece 3.

The channel 8 is preferably located in the back face of the pole 3 at a shorter dimensional distance from one side of the pole 3 than from the other side of the pole 3, so that the portion of the pole 3 constituting a magnetic core for the coil 7, is proportionately smaller than the remaining portion of the back surface of the pole 3.

In addition to the channel 8, in the pole 3, there is provided another slot or channel 9, in the back surface of the pole 3. The channel 9 is relatively shallow compared to the channel 8, and is confined to that portion of the back surface of the pole 3, confined within the winding 7. The channel 9 constitutes a non-magnetic gap between that portion of the pole 3 confined within the core of the winding 7 and the frame 4, and is provided with a filler member 10, of non-magnetic material such as brass or copper or other non-magnetic material. The purpose of the non-magnetic member 10 is to provide rigidity of construction, it being understood, however, that the member 10 may be omitted without effecting the magnetic circuit in which case the channel 9 would constitute a non-magnetic air-gap within the core of winding 7 between the pole 3 and the frame 4.

Figure 11:
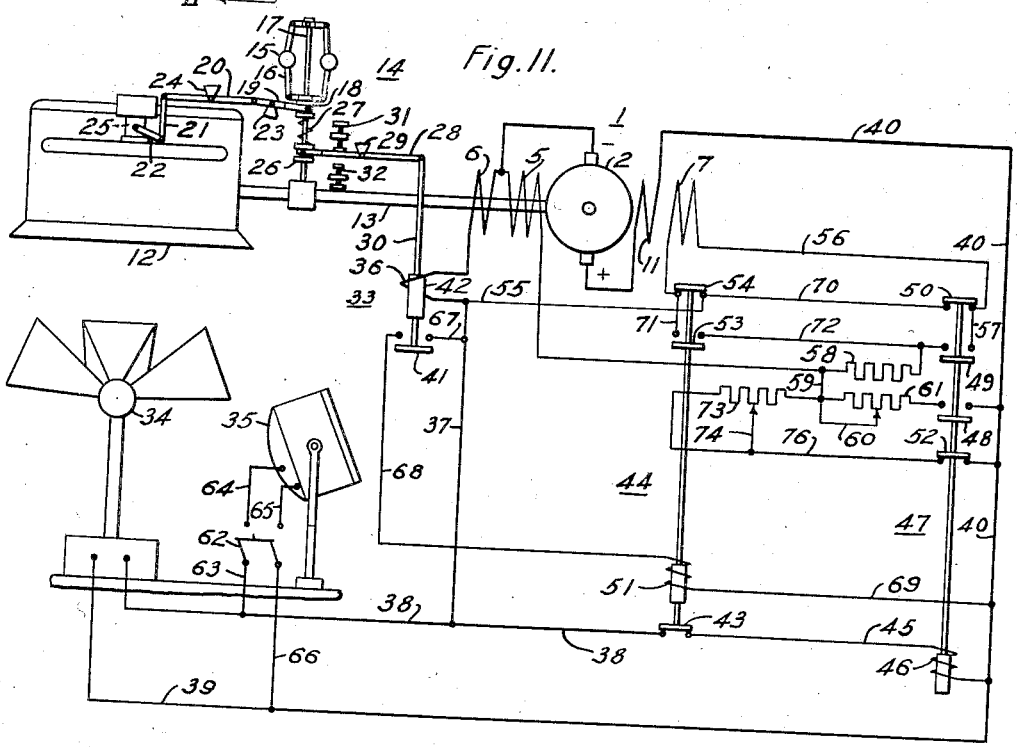
Fig. 11 is a schematic diagram of the application of the generator output to the load in which the auxiliary field winding is connected in shunt with the armature, and the control system therefor.

The winding 7 may be connected in shunt circuit relation with the shunt field winding 5 and excited either cumulatively or differentially as operating conditions may necessitate, by control relays, as shown in Fig. 11, in which case the winding 7 is excited directly from the generator terminals.

Figure 12:
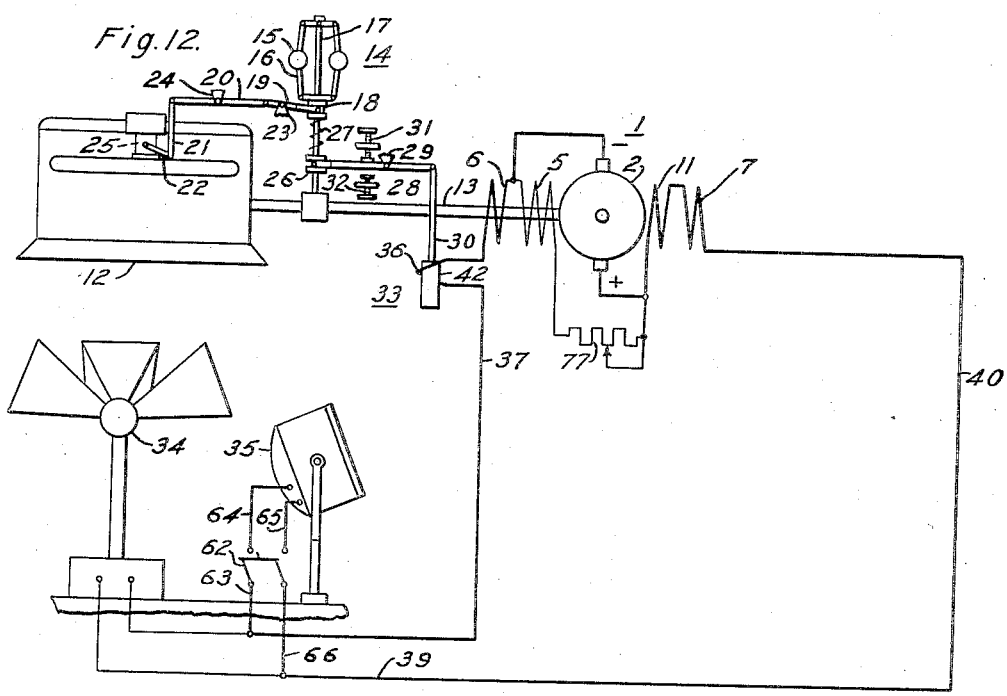
Fig. 12 is a schematic circuit diagram showing a modification of the control system shown in Fig. 11 in which the auxiliary field winding is connected in series with the armature.

The winding 7 may also be connected in series with the main series field winding 6 carrying the load current, as shown in Fig. 12, in which case it will tend to act as a current regulating coil and tend to hold the output current constant.

Figure 13:
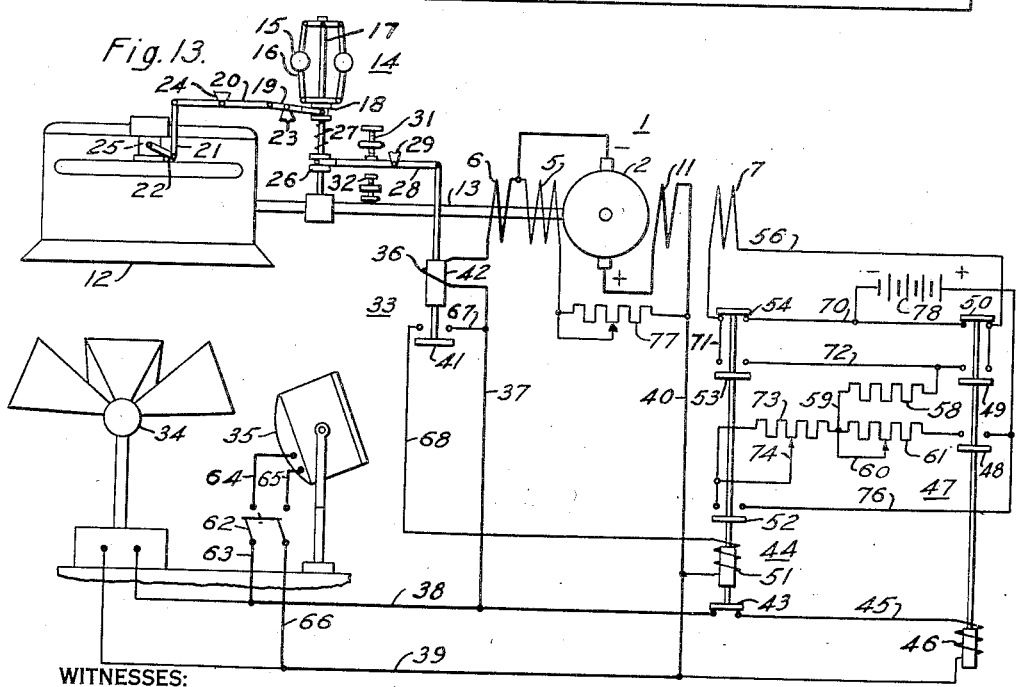
Fig. 13 is a schematic diagram showing another modification of the control system shown in Figs. 11 and 12 in which the auxiliary field winding is excited from an external source.

The winding 7 may also be separately excited from an external source, either cumulatively or differentially as operating conditions may necessitate, by control relays, as shown in Fig. 13.

The purpose, effect and operation of the winding 7 and the non-magnetic gap 9 will now be fully explained.

Generators designed for anti-aircraft units should operate at approximately the same voltage output and maintain repeat performance within very close limits at different speeds, for example, at 850 R. P. M. or 1200 R. P. M. if minimum noise level under detecting device load is to be obtained. For example, the generator must be capable of delivering 15 amperes at approximately 105 volts at a running speed of 850 R. P. M. for the detecting device load and also be capable of delivering 165 amperes at 100 volts at a running speed of 1200 R. P. M. for the searchlight and the detecting device loads, through several cycles of operation changing from detecting device load only, to searchlight and detecting device loads, back to detecting device load only, etc.

An additional requirement is that the searchlight load voltage must be maintained within very narrow limits, for example, within 1½% of a preset operating voltage, through several cycles of repeated changes from detecting device load only, to searchlight load, and detecting device load, back to detecting device load only, etc. This requires that the generator have a considerable amount of saturation at 1200 R. P. M. Ordinarily, it would then be impossible to drop the speed of the generator to 850 R. P. M. and still obtain 105 volts output from the generator for the detecting device.

This difficulty may be overcome and the desired saturation obtained by the introduction of the auxiliary field winding 7 and the non-magnetic gap 9, as hereinbefore described, and which will be more fully explained hereinafter.

Assume that the main shunt field winding 5 produces a flux passing from the armature 2 through the pole 3, and into the frame 4. When the winding 7 is not excited, this flux will flow through both magnetic paths, i. e., through the portion of the pole 3 within the core of coil 7, also through the portion of pole 3 which is not confined by the coil 7 to the frame 4, and only normal saturation will result.

When the winding 7 is excited differentially to the main shunt field winding 5, it will produce a flux passing from the frame 4 through the portion of the pole 3 within the winding 7, thence through the portion of the pole 3 that is not confined by the winding 7 and back to the frame 4. Therefore, all of the useful flux coming from the armature 2, plus the leakage flux, plus the flux produced by the winding 7 must pass through the portion of the pole 3 which is not confined by the winding 7. This results in saturation of that part of the magnetic circuit and when properly proportioned, will allow only such flux to pass through the armature that similar characteristics may be obtained at 1200 R. P. M. with the winding 7 excited differentially as were obtained at 850 R. P. M. with the winding 7 open, or with the winding 7 connected cumulatively.

The numerical values used herein for voltages, loads and speeds are only to illustrate and explain the operation of my invention, it being understood, however, that voltages, loads and speeds may be of any reasonable values with properly proportioned design.

When the winding 7 is connected cumulatively with the main shunt field winding 5, the ampere turns in the winding 7 add to the ampere turns of the main shunt field winding 5 with the result that less energy is required to excite the main shunt field winding 5 for producing the same flux as would be produced if the winding 7 were not connected cumulatively with the main shunt field winding 5. This results in a lower temperature rise and also results in higher efficiency in the event the winding 7 is connected in series with the main shunt field winding 5. Another result of connecting the winding 7 cumulatively with the main shunt field winding 5 is that it maintains the main shunt field winding 5 and the winding 7 at approximately the same relative temperature and consequently the division of current between them, when connected in parallel, is approximately the same proportion.

Referring now particularly to the non-magnetic gap 9, the purpose of the gap 9 is to increase the accuracy of control of the control flux produced by the winding 7 by requiring a greater change in ampere turns to produce a given change in the control flux at low densities, and further, to cause the control flux to be relatively ineffective at low field ampere turns.

To illustrate the utility and effectiveness of the non-magnetic gap 9, reference may be had to the curves shown in Figs. 3 and 4. The curve shown in Fig. 3 shows the saturation of a control path without the non-magnetic gap and the curve shown in Fig. 4 shows the saturation of a control path with the non-magnetic gap.

Assuming, for example, that the non-magnetic gap is not used and that the winding 7 is connected in series with the main shunt field winding 5, and the excitation of the main shunt field winding 5 changed so as to change the control ampere turns from A to B, as illustrated by the curve in Fig. 3, the control flux will only change from C to D. However, by using the non-magnetic gap 9, the change from C to D will be much greater and more nearly proportioned to the change in ampere turns, as illustrated by the curve in Fig. 4. The benefits of this action are to obtain a more accurate control of the armature flux. By causing the control flux to be reduced approximately in proportion to the control ampere turns, a break in the saturation curve is obtained tending to give it a shape more nearly approaching natural saturation and thereby improving stability.

The operation of the above-described apparatus may be set forth as follows:

Referring particularly to Fig. 11 of the drawings, there is shown diagrammatically a direct current generator 1 having an armature 2, a shunt field winding 5, a series field winding 6, an auxiliary field winding 7 and a commutating field winding 11.

The armature 2 of the generator is mechanically connected to a prime mover 12 by a shaft 13 through a speed governing device 14. The governing device 14 comprises a pair of centrifugally actuated weights 15 supported by linkage mechanism 16 mounted on a shaft 17 which is driven by the shaft 13. Secured to the linkage mechanism 16 and slidably mounted on the shaft 17 there is located a sleeve member 18. The sleeve member 18 is mechanically connected by levers 19, 20, 21 and 22 and lever supporting members 23 and 24, to a fuel control valve 25 on the prime mover 12. The lever 19 is pivotally supported at one end by the sleeve member 18. The lever 22 is secured to the fuel valve 25 of the prime mover 12. There is also slidably mounted on the shaft 17 another sleeve member 26. A spring 27 is mounted on the shaft between the sleeve members 18 and 26 and is secured at the ends thereof to the sleeve members 18 and 26. A lever 28 is pivotally supported by a supporting member 29. One end of the lever 28 is pivotally connected to the sleeve member 26 and pivotally connected to another lever 30 at the other end. Adjusting screws 31 and 32 are disposed on each side of the lever 28 and are provided to adjust the motion of the sleeve 26 on the shaft 17. The lever 30 is secured to a governor relay 33.

A detector device 34 and a searchlight 35 are adapted to be connected across the generator 1.

Assuming that it is desired to set the antiaircraft unit into operation, the prime mover 12 is set into motion, thereby driving the generator 1. The speed of the prime mover 12 is adjusted by the speed governing device 14 to, for example, 850 R. P. M. for the detecting device load.

The shunt field circuit which causes the generator to build up to voltage is as follows:

From the negative terminal of the generator 1, through the shunt field winding 5, conductor 59, rheostat 73, rheostat arm 74, conductor 76, contact 52 of relay 47, conductor 49, commutating winding 11, to the positive terminal of the generator 1. As long as contact 41 remains open, coil 51 remains deenergized, contacts 43 and 54 are closed and coil 46 is energized.

The current drawn by the detecting device 34 flows through a solenoid winding 36 of the relay 33, but this current is not of sufficient value to actuate the relay 33. A circuit for the detecting device 34 is then established from the negative terminal of the generator 1 through the series field winding 6, the solenoid winding 36, conductor 37, conductor 38, detecting device 34, conductor 39, conductor 40, commutating field winding 11, to the positive terminal of the generator 1.

When the generator 1 is supplying power to the detecting device 34, the governing mechanism 14 is positioned substantially as shown and the contact 41 of the relay 33 remains in open circuit position.

When sufficient voltage is generated to energize a relay coil 46, thereby closing contacts 48 and 49 and opening contacts 50 and 52, the shunt field circuit is changed from the negative terminal of the generator, through the shunt field winding 5, conductor 59, rheostat arm 60, rheostat 61, contact 48, conductor 40, winding 11 to the positive terminal of the generator 1, and the auxiliary winding 7 is connected cumulatively with the main field winding 5, the purpose and effect of which has been previously explained. This action will occur under all loads until sufficient current is drawn to actuate relay 33.

The circuit for connecting the winding 7 cumulatively to the main field winding 5 may be traced as follows: From the negative terminal of the generator 1 through the series field winding 6, relay winding 36, conductor 55, contact 54, winding 7, conductor 56, conductor 57, contact 49, balancing resistor 58, conductor 59, detecting device load rheostat 61 and contact arm 60, contact 48, conductor 40, commutating field winding 11, to the positive terminal of the generator 1.

The same operation of control relays connecting the auxiliary winding 7, cumulatively will occur at any load from no load to that value of current necessary to actuate relay 33.

Assuming that it is then desired to use the searchlight 35, the switch 62 is closed, thereby connecting the searchlight 35 across the generator 1. The searchlight 35 requires considerably more power than the detecting device 34. Therefore, the generator 1 is required to deliver an increased amount of current to the load which now includes both the detecting device 34 and the searchlight 35. The circuit for the searchlight load may be traced as follows: From the negative terminal of the generator 1, series field winding 6, solenoid winding 36, conductor 37, conductor 38, conductor 63, switch 62, conductor 64, searchlight 35, conductor 65, switch 62, conductor 66, conductor 39, conductor 40, commutating winding 11 to the positive terminal of the generator 1. The current required to energize both the detecting device 34 and the searchlight 35 is now of sufficient value to energize the winding 36 of the relay 33, causing the solenoid core 42 of the relay 33 to move upwardly. The actuation of the solenoid core 42 causes two distinct operations. First, the automatic adjustment of the governing device 14, to increase the speed of the prime mover 12 and the generator 1, and second, to close the contact 41 of relay 33, thereby establishing a circuit for connecting the control auxiliary field winding 7 in circuit, differentially to the main field winding 5.

When the solenoid core 42 is moved upwardly, it actuates the lever 28 so that the sleeve 26 is moved in a downward direction on the shaft 17 until the lever 28 engages the adjusting screw 32, thereby causing a recalibration of the speed governing device 14, thus allowing the prime mover 12 to speed up to say 1200 R. P. M. This calibration causes an increase of the tension on the spring 27 and tends to pull the sleeve 13 downwardly on the shaft 17. This action actuates the levers 19, 20, 21 and 22, thereby opening the fuel valve 25 to a wider open position, and consequently allowing the prime mover 12 to speed up and thereby speeding up the generator 1.

Assume, for example, that the adjusting screw 32 is adjusted so as to limit the prime mover and generator speed to 1200 R. P. M. The generator 1 is now running at a higher speed and delivering a higher current than it was when it was running at 850 R. P. M. and delivering a low current to the detecting device only.

As previously explained, if minimum noise level under detecting device load is to be obtained, the generator should be capable of supplying a light load such as the detecting device 34 and also a heavy load such as the searchlight 35 at different speeds of the generator and yet obtain the required voltage output characteristics at these loads, when passing through the load cycle. It is obvious to those skilled in the art that when a generator is running at low speed and then the speed is increased, the voltage output will increase proportionately. Since it is desired to increase the speed of the generator to supply a heavier load and yet maintain a voltage output substantially of the same values as when running the generator at low speed for supplying a light load, it becomes necessary to introduce means for maintaining substantially constant voltage output at different speeds of the generator. I have found that by connecting the winding 7 differentially in circuit with the main shunt field winding 5 to control the flux saturation in the magnetic circuit, that substantially the same voltage output of the generator may be maintained when the generator is running at high speed and heavy load as can be maintained at low speed and light load with the winding 7 connected cumulatively with the main shunt field winding 5.

When the relay winding 36 is sufficiently energized to close the contact 41, a circuit is established to energize the winding 51 of relay 44. This circuit may be traced from the negative terminal of the generator 1, through series field winding 6, relay winding 36, conductor 37, conductor 67, contact 41, conductor 68, winding 51, conductor 69, conductor 40, commutating winding 11 to the positive terminal of the generator 1. When the winding 51 of relay 44 is energized, the contacts 43, 53 and 54 are moved to a position opposite to that shown in Fig. 11. Contacts 43 and 54 open and contact 53 closes. When contact 43 is opened the winding 46 of relay 47 is deenergized and the relay contacts 48, 49, 50 and 52 are in the positions shown in Fig. 11. A circuit is thereby established for connecting the winding 7 differentially to the main shunt field winding 5 and may be traced as follows: From the negative terminal of the generator 1, series field winding 6, relay winding 36, conductor 55, conductor 70, contact 50, conductor 56, winding 7, conductor 71, contact 53, conductor 72, balancing resistor 58, conductor 59, searchlight load rheostat 73 and contact arm 74, conductor 76, contact 52, conductor 40, commutating winding 11, to the positive terminal of the generator 1.

The generator now running at high speed, for example, at 1200 R. P. M. is supplying the searchlight and the detecting device at, for example, 165 amperes at 100 to 105 volts. When it is necessary to disconnect the searchlight 35, and use only the detecting device 34, the switch 62 is opened thereby decreasing the load on the generator and consequently deenergizing the relay coil 36 to such an extent that the relay 33 causes a recalibration of the governing device 14, decreasing the speed of the prime mover 12 and the generator 1 to 850 R. P. M. Simultaneously, the relays 44 and 47 are actuated to positions for establishing circuits for connecting the winding 7 cumulatively with the main shunt field winding 5.

Referring now to Fig. 12, the winding 7 is shown connected in series with the field windings 6 and 11. The principle of operation of this system is the same as previously explained in connection with Fig. 11, except that since the winding 7 is always connected in series with the load, the relays 44 and 47 are not needed. In this system the desired output voltage is obtained by adjusting the excitation of the main shunt field winding 5 under all load conditions by the adjustable resistor 77. By connecting the winding 7 in series with the load, it will act as a current regulating coil and tend to hold the output current constant.

While Fig. 12 shows a very simplified embodiment of my invention, that shown in Fig. 11 is the preferred embodiment.

The schematic circuit diagram shown in Fig. 13 is the same as that shown in Fig. 11 except that the winding 7 is separately excited from an external direct current source 78 such as a battery or direct current generator, and that the main shunt field excitation is adjusted by the rheostat 77.

In Figs. 5, 6 and 7 there are shown modifications of the auxiliary winding 7 embodying a plurality of coils and the manner in which they are placed in the pole pieces 3, as hereinbefore described.

In Fig. 5 the winding 7 is shown as comprising a plurality of coils 7a and 7b placed in a plurality of slots 8 and 8a, in the pole piece 3.

In Fig. 6 the winding 7 is shown as comprising a plurality of coils 7a and 7b placed in a single slot 8 in the pole piece 3.

In Fig. 7 the winding 7 is shown as comprising a plurality of coils 7a and 7b in a plurality of slots 8 and 8a in the pole piece 3.

In Figs. 5 and 7 in which the pole pieces 3 have a plurality of slots 8 and 8a, an additional non-magnetic filler member 10a is shown in elevation.

In Fig. 8 there is shown a schematic circuit diagram of the connections of the coils 7a and 7b as shown in Figs. 5, 6 or 7. In this circuit the coils 7a and 7b are represented as being placed on two separate pole pieces of a multi-pole machine, one coil 7a being on one pole piece and the other coil 7a being on the other pole piece and connected in series with each other and the armature 2. The coils 7b are likewise represented as being placed on different poles and are connected in series with each other and shunted across the armature 2 and are adapted to be connected either cumulatively or differentially with the main shunt field winding (not shown), by the control device 79.

Fig. 9 is a schematic circuit diagram showing how the coil structures shown in Figs. 5, 6 and 7 may be connected between the different poles of the machine, except that the coils 7b are shown as being separately excited from an external direct current source 80.

In Fig. 10 the coil structures shown in Figs. 5 6 and 7 are shown to represent the coils 7a and 7b as being placed on different poles of the machine and are adapted to be separately excited from external sources 81 and 82, such as a battery or direct current generator.

Although I have shown and described certain specific embodiments of my invention, I do not wish to be restricted to the specific structural details, arrangement of parts, or circuit connections herein set forth, as various other modifications thereof may be effected without departing from the spirit and scope of my invention. My invention, therefore, is not to be restricted except insofar as is necessitated by the prior art and by the spirit of the appended claims.

I claim as my invention:

1. A pole piece for a dynamo-electric machine comprising a laminated core, a slot in at least one end of the core, a field winding disposed in said slot, a non-magnetic gap in at least one end of the core, a non-magnetic filler member in said gap, said gap and said filler member being disposed within the core of said field winding, said field winding and said gap cooperating to control the magnetic saturation of the pole.

2. A pole piece for a dynamo-electric machine comprising a laminated core, a slot in at least one end of the core, a plurality of field windings disposed in said slot, a non-magnetic gap in at least one end of the core, a non-magnetic filler member in said gap, said gap and said filler member being disposed within the core of said field windings, said field windings and said gap cooperating to control the magnetic saturation of the pole.

3. A pole piece for a dynamo-electric machine comprising a laminated core, a plurality of slots in at least one end of the core, field windings disposed in said slots, a plurality of non-magnetic gaps in at least one end of the core, a plurality of non-magnetic filler members in said gaps, said gaps and said filler members being confined within the cores of said field windings, said field windings and said gaps cooperating to control the magnetic saturation of the pole.

4. A pole piece for a dynamo-electric machine, comprising a laminated core, a plurality of slots in at least one end of the core, field windings comprising a plurality of coils, certain of said coils disposed in certain of said slots, certain other of said coils disposed in certain other of said slots, a plurality of non-magnetic gaps in at least one end of the core, a plurality of non-magnetic filler members in said gaps, said gaps and said filler members being confined within the cores of said coils, said field windings and said gaps cooperating to control the magnetic saturation of the poles.

5. In a control system for a dynamo-electric machine, comprising, in combination, an electric generator connected to a load, driving means for said generator, a governor for governing the speed of the driving means and the generator, said generator comprising a frame, an armature, pole pieces on said frame, main field windings on said pole pieces, auxiliary field windings on said pole pieces cooperating with the main field windings for selectively controlling the magnetic saturation of the poles, means including a governing relay for automatically adjusting the governor to change the speed of the generator upon a change in load and means responsive to the operation of said governing relay for connecting the auxiliary field windings either cumulatively or differentially depending on load current values.

6. In a control system for a dynamo-electric machine, comprising, in combination, an electric generator connected to a load, driving means for said generator, a governor for governing the speed of the driving means and the generator, said generator comprising a frame, an armature, pole pieces on said frame, main field windings on said pole pieces, auxiliary field windings on said pole pieces cooperating with the main field windings for selectively controlling the magnetic saturation of the poles, a current responsive relay associated with the said governor to effect a change in speed of the generator upon a change in load, and relays responsive to the operation of the said current responsive relay for connecting the auxiliary field windings either cumulatively or differentially depending on load current values.

7. In a control system for a dynamo-electric machine, comprising, in combination, an electric generator connected to a load, driving means for said generator, a governor for governing the speed of the driving means and the generator, said generator comprising a frame, an armature, pole pieces on said frame, main field windings on said pole pieces, auxiliary field windings on said pole pieces, said pole pieces having non-magnetic gaps confined within the cores of said auxiliary field windings, said field windings and said non-magnetic gaps cooperating with the main field windings for selectively controlling the magnetic saturation of the poles, means including a governing relay for automatically adjusting the governor to change the speed of the generator upon a change in load and means responsive to the operation of said governing relay for connecting the auxiliary field windings either cumulatively or differentially depending on load current values.

8. In a control system for a dynamo-electric machine comprising, in combination, an electric generator connected to a load, driving means for said generator, a governor for governing the speed of the driving means and the generator, said generator comprising a frame, an armature, pole pieces on said frame, main field windings on said pole pieces, auxiliary field windings on said pole pieces, said auxiliary field windings being connected in series with the load and the generator terminals, said pole pieces having non-magnetic gaps confined within the cores of said auxiliary field windings, said auxiliary field windings and said non-magnetic gaps cooperating with the main field windings for selectively controlling the magnetic saturation of the poles, means including a governing relay for automatically adjusting the governor to change the speed of the generator upon a change in load.

9. In a control system for a dynamo-electric machine comprising, in combination, an electric generator connected to a load, driving means for said generator, a governor for governing the speed of the driving means and the generator, said generator comprising a frame, an armature, pole pieces on said frame, main field windings on said pole pieces, auxiliary field windings on said pole pieces, said auxiliary field windings being excited by the generator and cooperating with the main field windings for selectively controlling the magnetic saturation of the poles, means including a governing relay for automatically adjusting the governor to change the speed of the generator upon a change in load and means responsive to the operation of said governing relay for connecting the auxiliary field windings either cumulatively or differentially depending on load current values.

10. In a control system for a dynamo-electric machine, comprising, in combination, an electric generator connected to a load, driving means for said generator, a governor for governing the speed of the driving means and the generator, said generator comprising a frame, an armature, pole pieces on said frame, main field windings on said pole pieces, auxiliary field windings on said pole pieces, said auxiliary field windings being separately excited from an external source, said pole pieces having non-magnetic gaps confined within the cores of said auxiliary field windings, said field windings and said non-magnetic gaps cooperating with the main field windings for selectively controlling the magnetic saturation of the poles, means including a governing relay for automatically adjusting the governor to change the speed of the generator upon a change in load and means responsive to the operation of said governing relay for connecting the auxiliary field windings either cumulatively or differentially depending on load current values.

11. In a control system for a dynamo-electric machine comprising, in combination, an electric generator, means for driving the generator and a speed governor, said generator comprising an armature and a plurality of pole pieces, main field windings on said pole pieces, auxiliary field windings on said pole pieces, said auxiliary field windings comprising a plurality of coils on said pole pieces, certain of said coils being connected in series with said armature, certain other of said coils being connected in parallel with said armature and control means for connecting said coils either cumulatively or differentially depending on load current values.

12. In a control system for a dynamo-electric machine comprising, in combination, an electric generator, means for driving the generator and a speed governor, said generator comprising an armature and a plurality of pole pieces, main field windings on said pole pieces, auxiliary field windings on said pole pieces, said auxiliary field windings comprising a plurality of coils on said pole pieces, certain of said coils being connected in series with said armature, certain other of said coils being connected in parallel with said armature and control means for connecting said parallel connected coils either cumulatively or differentially depending on load current values.

13. In a control system for a dynamo-electric machine comprising, in combination, an electric generator, means for driving the generator and a speed governor, said generator comprising an armature and a plurality of pole pieces, main field windings on said pole pieces, auxiliary field windings on said pole pieces, said auxiliary field windings comprising a plurality of coils on said pole pieces, certain of said coils being connected in series with said armature, certain other of said coils being connected in parallel with said armature and control means for connecting said series connected coils and said parallel connected coils in series or parallel and either cumulatively or differentially depending on load current values.

14. In a power supply for an anti-aircraft unit, in combination, a generator, driving means for said generator, speed control means for said generator and said driving means, a detecting device, an illuminating device, said generator including an armature, pole pieces having main field windings mounted thereon and means for maintaining a constant voltage for the detecting device and the illuminating device, said last means comprising auxiliary field windings on the poles of the generator adapted to be connected either cumulatively or differentially with the main field windings depending on load current values.

15. In a power supply for an anti-aircraft unit, in combination, a generator, driving means for said generator, speed control means for said generator and said driving means, a detecting device, an illuminating device, said generator including an armature, pole pieces having main field windings mounted thereon and means for maintaining a constant voltage for the detecting device and the illuminating device, said last means comprising auxiliary field windings on the poles of the generator adapted to be connected cumulatively with the main field windings for the detecting device load, and connected differentially with the main field windings for both the detecting device and illuminating device loads.

16. In a power supply for an anti-aircraft unit, in combination, a generator, driving means for said generator, speed control means for said generator and said driving means, a detecting device, an illuminating device, said generator including an armature, pole pieces having main field windings mounted thereon and means for maintaining a constant voltage for the detecting device and the illuminating device, said last means comprising auxiliary field windings on the poles of the generator and cooperating non-magnetic gaps in said poles, said gaps being confined within the cores of said auxiliary field windings and said auxiliary field winding being adapted to be connected either cumulatively or differentially with the main field windings depending on load current values.

17. In a power supply for an anti-aircraft unit, in combination, a generator, driving means for said generator, speed control means for said generator and said driving means, a detecting device and illuminating device, said generator including an armature, pole pieces having main field windings mounted thereon and means for maintaining a constant voltage for the detecting device and the illuminating device, said last means comprising auxiliary field windings on the poles of the generator and cooperating non-magnetic gaps in said poles, said gaps being confined within the cores of said auxiliary field windings and said auxiliary field windings being adapted to be connected cumulatively with the main field windings for the detecting device load, and connected differentially with the main field windings for both the detecting device and illuminating device loads.

18. A voltage regulating device for an anti-aircraft power supply unit comprising, in combination, an electric generator, a prime mover for said generator, and a speed regulating governor, said generator including an armature, and pole pieces having main field windings, said voltage regulating device comprising auxiliary field windings on said pole pieces cooperating with non-magnetic gaps in said pole pieces, said auxiliary field windings being adapted to be connected cumulatively with the main field windings for a light load and connected differentially with the main field windings for a heavy load.

ALBERT W. KIMBALL.